US006345426B1

(12) United States Patent
Collier

(10) Patent No.: US 6,345,426 B1
(45) Date of Patent: Feb. 12, 2002

(54) TOOL FOR REMOVAL OF AN ENGINE CYLINDER LINER

(75) Inventor: Dennis Reef Collier, Westland, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/759,500

(22) Filed: Jan. 16, 2001

(51) Int. Cl.[7] ................................................ B23P 19/04
(52) U.S. Cl. ............................. 29/263; 29/278; 29/282
(58) Field of Search .......................... 29/263, 255, 280, 29/278, 282

(56) References Cited

U.S. PATENT DOCUMENTS 4,059,883 A * 11/1977 Osborne ...................... 29/263
5,231,733 A * 8/1993 Dittman ....................... 29/271
5,875,534 A * 3/1999 Jackson ....................... 29/255
6,122,810 A * 9/2000 McInnes ...................... 29/264

* cited by examiner

*Primary Examiner*—Joseph J. Hail, III
*Assistant Examiner*—Lee Wilson
(74) *Attorney, Agent, or Firm*—Bill C. Panagos

(57) ABSTRACT

A cylinder liner removal tool (11) is shown having a gripping portion (12) capable of expanding against the inner surface of the cylinder liner (14). The gripping portion (12) has a rod (26). Concentrically disposed about the rod (26) in trailing order is a stop (32), a plate (36), a cylindrical mandrel (38), a shoulder (42), a bearing (44), and a nut (40). The mandrel (38) is hollow having a recess (52). The shoulder (42) has a plug member (66) disposed within the recess (52). Torquing down upon the nut (40) compresses the mandrel (38) between a radially extending shelf member (62) of the shoulder (42) and the plate (36). The mandrel (38) thereby expands radially outward to frictionally grip the cylinder liner (14).

20 Claims, 3 Drawing Sheets

TOOL FOR REMOVAL OF AN ENGINE CYLINDER LINER

TECHNICAL FIELD

This invention relates to a tool for removal of an engine cylinder liner and more particularly to a tool for removal of an engine cylinder liner and piston assembly.

BACKGROUND OF THE INVENTION

A cylinder liner is commonly used to define the combustion chamber of an engine, thereby providing a substantially frictionless mating surface for the piston rings of a piston assembly. The cylinder liners require replacement due to liner wear brought on by the combustion process and the linear reciprocating movement of the piston rings against the interior wall of the liner. When replacing the cylinder liner which is force fitted into the block of the engine, a tool is required to disengage and pull out the worn liner from above the engine. Typically, the piston assembly must first be detached from the crankshaft and pulled out through the top of the cylinder liner prior to removal of the cylinder liner itself Once the piston assembly is out of the way, the tool axially extends through the cylinder liner to grasp the bottom edge. Once grasped, the cylinder liner disengages and is pulled out through the top side of the engine block.

Unfortunately, not all engines have piston assemblies capable of removal prior to removal of the cylinder liner. Sometimes, the piston rod foot, that part which circumferentially surrounds the crankshaft, is wider than the inner diameter of the cylinder liner. In such instances another means most be developed to grip and disengage the cylinder liner for removal, since the un-removed piston assembly blocks access to the bottom edge of the cylinder liner.

SUMMARY OF THE INVENTION

The invention provides a tool having a gripping portion for frictionally engaging the inner wall of a cylinder liner. A radially extending stop is located at a leading end of a rod. Trailing the stop is a mandrel having an outer surface for engaging the cylinder liner. The rod longitudinally penetrates the mandrel. Disposed between the stop and the mandrel is a plate radially extending short of the outer surface of the mandrel. Threading to a trailing end of the rod is a nut. Located between the nut and the mandrel is a shoulder having a shelf portion penetrated by the rod. The shelf portion is generally perpendicular to the rod and engages the mandrel.

When the nut rotates down upon the shoulder from a trailing position to a leading position, therein defining an axial engagement range length, the mandrel compresses and extends radially outward, forcibly engaging the cylinder liner. Preferably, the mandrel has a recess concentric to the rod. The recess enhances the compression capability of the mandrel. A plug portion of the shoulder extends into the recess of the mandrel thereby assuring the mandrel distends in a radial outward direction, and not inward. Preferably, the cylinder liner removal tool has a torquing portion for engaging and torquing down upon the nut of the gripping portion. And, the tool has a removable lifting portion for pulling the cylinder liner and the piston assembly from the engine block.

By use of the cylinder liner removal tool of the present invention, a cylinder liner can be removed from an engine block by gripping the internal wall of the cylinder liner. Furthermore, the cylinder liner can be removed complete with the piston assembly.

BRIEF DESCRIPTION OF THE DRAWINGS

Reference is now made to accompanying drawings in which.

DETAILED DESCRIPTION OF THE PREFERRED EMBODIMENT

Figure 1:
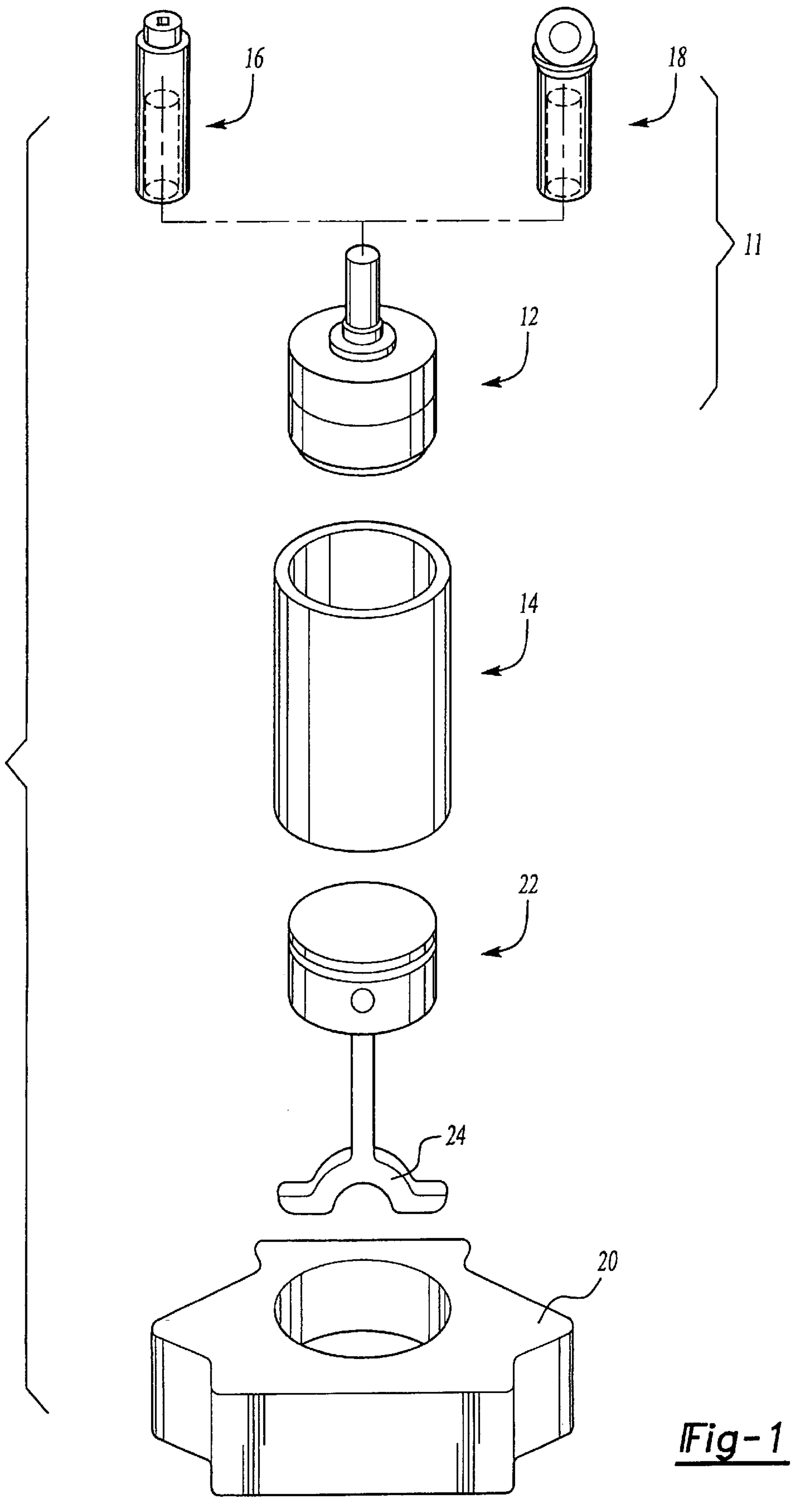
FIG. 1 is an exploded perspective view of a cylinder liner removal tool, a cylinder liner, and a piston assembly within an engine block environment.

Referring now to FIG. 1 of the drawings, a cylinder liner removal tool 11 is shown having three major portions. The first is a gripping portion 12 utilized to grip a cylinder liner 14. The gripping portion 12 first orientates inside the cylinder 14 wherein a torquing portion 16 engages to the gripping portion 12 from above. The torquing portion 16 torques down upon the gripping portion 12 forcing the gripping portion 12 to expand and engage forcibly the inside of the cylinder liner 14. A vacuum seal is thereby created between the gripping portion 12 and a piston assembly 22. Once gripped the torquing portion 16 is removed and a lifting portion 18 secures to the expanded gripping portion 12. Rotation of a crankshaft of the engine forces the piston assembly 22 to move upward against the vacuum seal breaking the cylinder liner 14 away from an engine block 20. The lifting portion 18 then lifts the cylinder liner 14 from the engine block 20. When lifting the cylinder liner 14 the piston assembly 22, disposed below the gripping portion 12, lifts out with the cylinder liner 14 via the vacuum created between the gripping portion 12 and the piston assembly 22.

This cylinder liner removal tool 11 with its strong gripping capacity also creates a substantial vacuum which enables lifting out both the cylinder liner 14 and the piston assembly 22. It is particularly useful in engine maintenance procedures where the piston rod foot 24 is wider than the inner diameter of the cylinder liner 14, in which case the piston assembly 22 cannot be lifted out of the cylinder liner 14 from above prior to removal of the cylinder liner 14. Moreover, in such circumstance there is no way to grip the cylinder liner 14 from beneath in order to pull the cylinder liner 14 in an upward direction because the piston assembly 22 obstructs egress.

In this vacuum tool application, when installing the cylinder liner 14 the piston assembly 22 first installs into the cylinder liner 14 from below, the gripping portion 12 creates the vacuum seal, and the whole assembly lowers into the engine block 20. Thus, assembly and maintenance operations are simplified.

Figure 2:
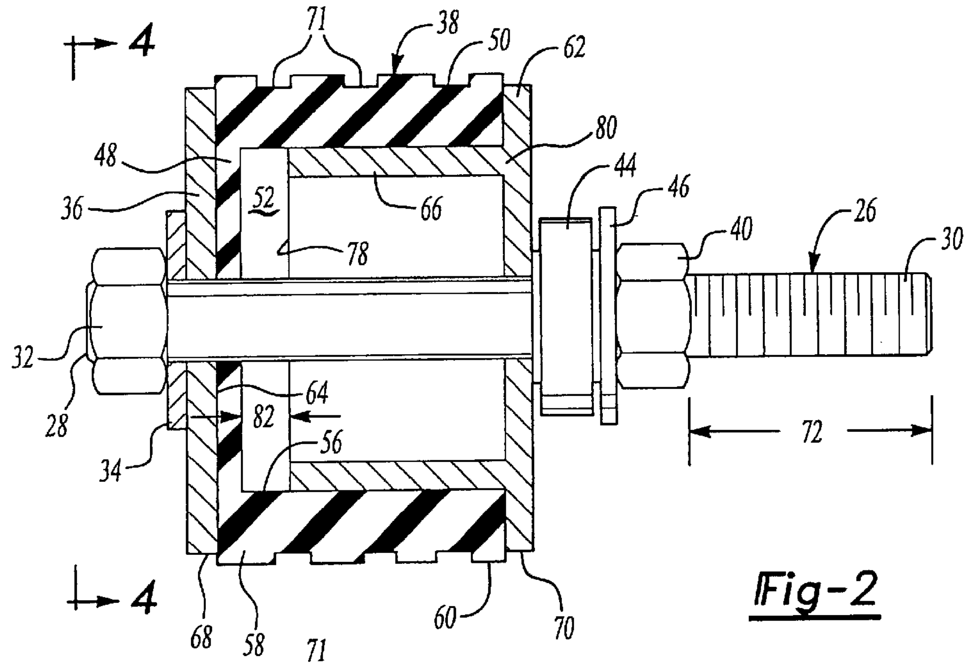
FIG. 2 is a cross sectional view of a gripping portion of the cylinder liner removal tool in disengaged mode.

Referring now to FIG. 2, the gripping portion 12 of the cylinder liner removal tool 11 has a rod 26. Rod 26 has a leading end 28 and a trailing end 30. Attaching to the leading end 28 and extending radially outward thereof is stop 32. Stop 32 can be an integral part of rod 26 or a threaded nut, wherein the leading end 28 is threaded to engage the nut. Trailing and contacting the stop 32 is stop washer 34. Trailing and contacting the stop washer 34 is a plate 36. The plate 36 generally extends radially outward further than the stop washer 34. Trailing and contacting plate 36 is a mandrel 38. The mandrel 38 radially extends as far or further outward than plate 36. Disposed between the mandrel 38 and a nut 40 is a shoulder 42. The mandrel 38 compresses between the shoulder 42 and the plate 36 when the nut 40 rotates toward the leading end 28 of rod 26. To assist in the torque down process of nut 40 a bearing 44 is disposed between the shoulder 42 and the nut 40. Furthermore, a bearing washer 46 is disposed between and contacts the bearing 44 and the nut 40.

The plate 36, the mandrel 38 and the shoulder 42 are generally shaped to conform to the inner cross section of the cylinder liner 14. The mandrel 38, disposed concentrically about the rod 26, has a base portion 48, a wall 50 and a recess 52. Radially defining the wall 50 is an outer surface 54 and an inner surface 56. Axially defining wall 50 is a first end 58 and a second end 60. Contacting first end 58 is the base portion 48. Making and annular engagement with second end 60 is a shelf member 62 of the shoulder 42. Defining the recess 52 is the bottom surface 64 of the base portion 48 and the inner surface 56 of the wall 50. The recess 52 enhances the compression characteristics of the expanding wall 50.

The shoulder 42 has a plug member 66 attaching to the shelf member 62. Plug member 66 fits snugly within the recess 52 of the mandrel 38. Plug member 66 assures that expansion of the mandrel 38 occurs in the radially outward direction, not inwardly, when the nut 40 torques down toward the leading end 28.

Figure 4:
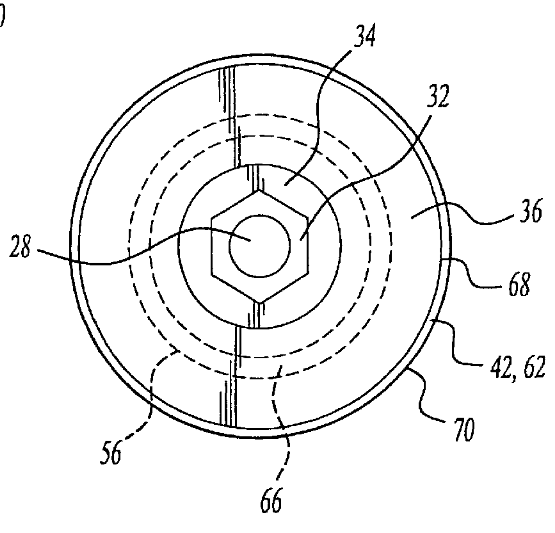
FIG. 4 is a bottom perspective view of the gripping portion of the cylinder liner removal tool.

Referring to FIGS. 2 and 4, compressive forces must evenly distribute circumferentially against wall 50 of the mandrel 38 in order to assure sufficient gripping and sealing occurs between the outer surface 58 and the cylinder liner 14. To achieve this, the plate 36 has a plate circumference 68 which is disposed radially between the outer surface 54 and the inner surface 56 of wall 50. The plate circumference 68 is substantially near the outer surface 54 but does not extend radially beyond. This prevents scoring of the cylinder liner 14 yet provides rigid support against the resilient forces of the mandrel 38. The shelf member 62 has a shelf circumference 70 substantially equal to the plate circumference 68. Shelf circumference 70 is disposed radially between the outer surface 54 and the inner surface 56 at the second end 60 of the wall 50. To further enhance the gripping and sealing capability of the mandrel 38, the outer surface 54 has at least one channel 71 circumferentially extending about the wall 50 of the mandrel 38. Each channel 71 is separated axially. The channel 71 swipes and cleans the inner side of the cylinder liner 14 thereby enhancing the gripping power and vacuum seal between the cylinder liner 14 and that portion of the outer surface 54 in actual contact with the cylinder liner 14.

Figure 3:
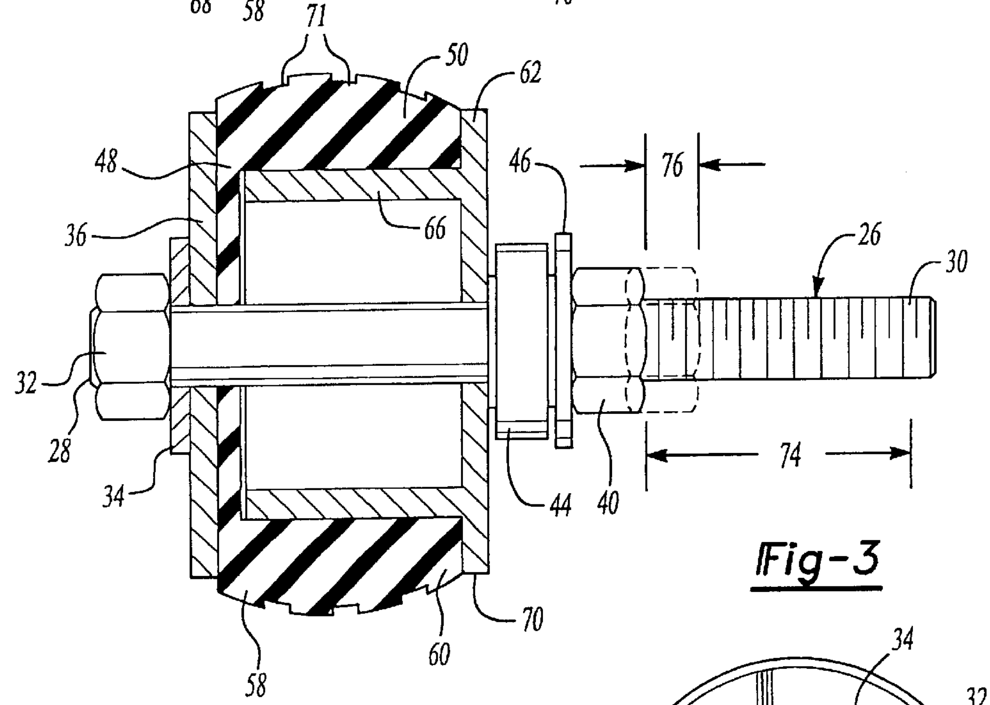
FIG. 3 is a cross sectional view of the gripping portion of the cylinder liner removal tool in engaged mode.

Referring to FIGS. 2 and 3 the gripping portion 12 (the mandrel) is shown in a non-engagement and an engagement state respectively. In FIG. 2, the nut 40 is disposed in a trailing position 72 which corresponds to a non-engagement state of the gripping portion 12. In FIG. 3, the nut 40 is in a leading position 74 which corresponds to an engagement state of the gripping portion 12. The difference between the axially extending distance of the trailing position 72 and the leading position 74 of the nut 40 defines an engagement range length 76. The plug member 66 has a free end 78 and a secured end 80. The secured end 80 attaches to the shelf member 62. A predefined length 82 is defined by the distance between the bottom surface 64 of the base portion 48 and the free end 78. The predefined length 82 must be greater than the engagement range length 76 so that the shoulder 42 does not bottom out upon the base portion 48 prior to the outer surface 54 of the wall 50 filly engaging the cylinder liner 14.

Figure 5:
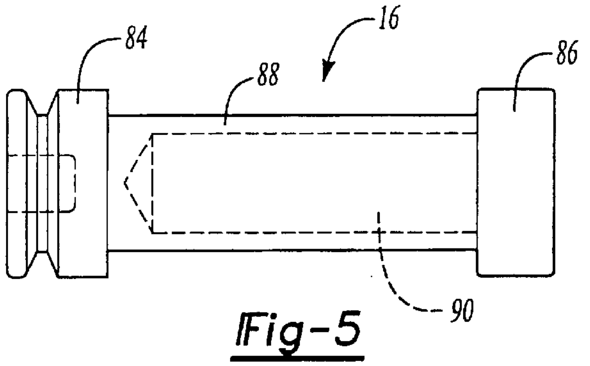
FIG. 5 is a longitudinal perspective view of a torquing portion of the cylinder liner removal tool.
Figure 6:
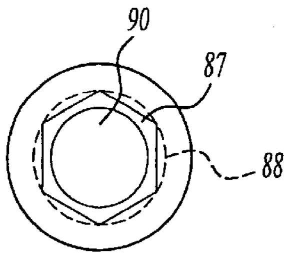
FIG. 6 is a bottom perspective view of the torquing portion.

Referring to FIGS. 5 and 6, the torquing portion 16 rotates via a driver end 84 when engaged to a common ratchet driving tool or air driven ratchet not shown. A socket end 86 of the torquing portion 16 engages to the nut 40 of the gripping portion 12. The trailing end 30 of rod 26 inserts into an extension member 88 of the torquing portion 16, similar to the upper end of a spark plug in a spark plug socket. The extension member 88 has a bore 90 which receives the trailing end 30. As shown in FIG. 6, the socket end 86 preferably has a hexagon shape recess 87 which receives and engages the nut 40. The socket end 86, the boar 90 and the driver end 84 are concentric to each other.

Figure 7:
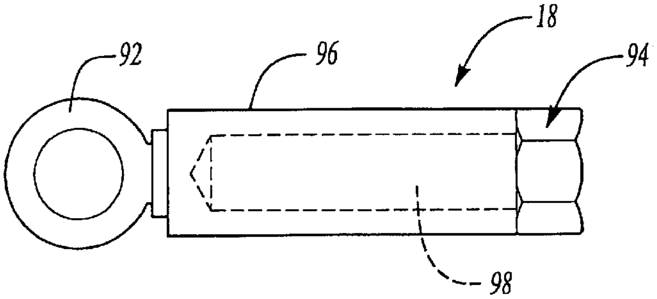
FIG. 7 is a longitudinal perspective view of a lifting portion of the cylinder liner removal tool.
Figure 8:
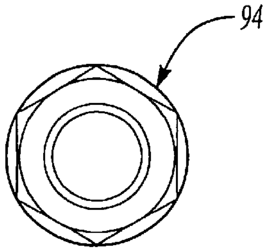
FIG. 8 is a bottom perspective view of the lifting portion.

Referring to FIGS. 7 and 8, the lifting portion 18 has a hook end 92 and a female threaded end 94. The female threaded end 94 threads onto the trailing end 30 of the gripping portion 12. The lifting portion 18 may also have an extension portion 96 having a bore 98 for receipt of trailing end 30. The extension portion 96 with bore 98 enables the female threaded end 94 to thread down upon the nut 40, thereby, acting as a lock nut when engaged upon the nut 40.

After the gripping portion 12 secures to the inside of cylinder liner 14 and the vacuum seal is created between the piston assembly 22 and the gripping portion 12, rotation of the crankshaft pushes the piston assembly 22 upward thereby compressed trapped within the air seal. The air is compressed to the point where it's upward directed force seal the piston assembly 22 is prevented from moving relative to the cylinder liner 14. Instead, the cylinder liner 14 breaks away from the engine block 20. Once freed, the hook end 92 of the lifting portion 18 secures to an exterior lifting means and the cylinder liner 14 complete with the piston assembly 22 lifts from the engine block 20. In a reverse manner, the cylinder liner 14 and the piston assembly 22 can be installed into the engine block 20 by use of the lifting portion 18 when the gripping portion 12 is engaged.

The invention as described above is the preferred embodiment because the cylinder liner removal tool 11 can be fabricated utilizing materials commonly found in an industrial shop setting. For instance, the extension member 88 and the extension member 96 of the torquing portion 16 and the lifting portion 18 respectively can be easily fabricated from a piece of pipe. Likewise, for the torquing portion 16, the driver end 84 and the socket end 86 may be fabricated from a common socket tool wherein the socket is cut in half perpendicular to its longitude. The cut surfaces of the two halves may then be welded onto either end of the cut pipe thereby forming the torquing portion 16 in a relatively inexpensive manner. Similarly the female threaded end 94 of the lifting portion 18 may be a simple nut welded onto the end of the cut pipe for the lifting portion 18. The hook end 92 likewise is welded onto the opposite end of the cut pipe thereby forming the lifting portion 18.

The rod 26 of the gripping portion 12 is preferably a threaded rod. The stop 32, as previously stated, is preferably a nut simply threaded onto the leading end 28 of the rod 26.

This eliminates any need of welding the stop 32 onto a rod 26, or the need to fabricate a unique rod 26 altogether. As a nut, the stop 32 may also be used as a redundant measure to disengage the gripping portion 12 after removal of the cylinder liner 14 from the engine block 20.

Figure 9:
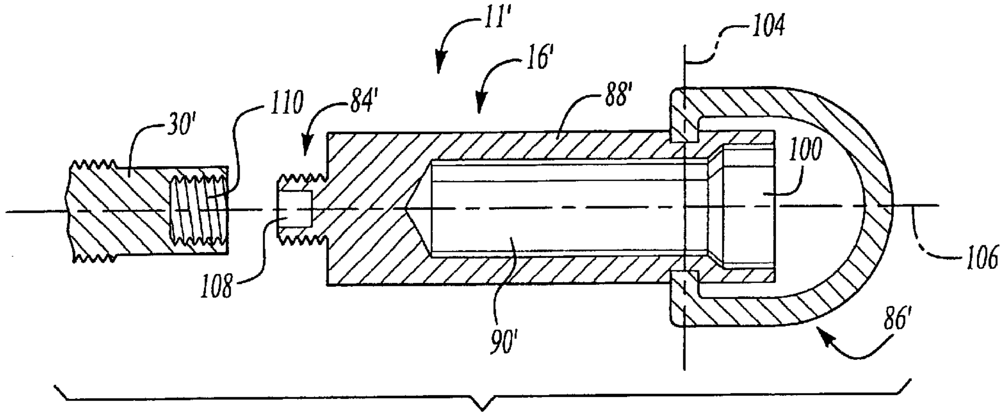
FIG. 9 is a partial longitudinal cross sectional view of a second embodiment of the cylinder liner removal tool.

If cost or complex machining is not a concern many other embodiments of the invention may be presented. Referring to FIG. 9, a second embodiment of the cylinder liner removal tool 11' is shown where the torquing portion 16 and the lifting portion 18 function as a single combination portion 16'. Combination portion 16' has a combination socket hook end 86' which first functions to engage the nut 40 of the gripping portion 12, and after a mere flipping around, from end to end, the combination portion 16', also functions as a hooking means to lift the cylinder liner 14 and piston assembly 22 out of the engine block 20. To accomplish this the combination socket-hook 86' has a socket 100 for engaging the nut 40 and a pivoting hook 102 for providing a lifting means. The hook 102 pivotally engages to the combination torque-lifting portion 16' wherein a pivoting axis 104 intersects a center line 106 of the combination torquing portion 16' at an axial location generally away from the socket 100. Portion 16' further has a driver-male threaded end 84' comprising male threads 108 which engage a female threaded bore 110 disposed at the trailing end 30 of the gripping portion 12. This engagement is needed for the lifting means. The driver-male threaded end 84' further has a driver recess 108. This feature of the driver-male threaded end 84' receives the ratcheting driver tool when the hook 102 is pivoted off to the side and the socket 100 is in receipt of the nut 40 of the gripping portion 12. The combination portion 16' can then torque down upon the gripping portion 12.

Figure 10:
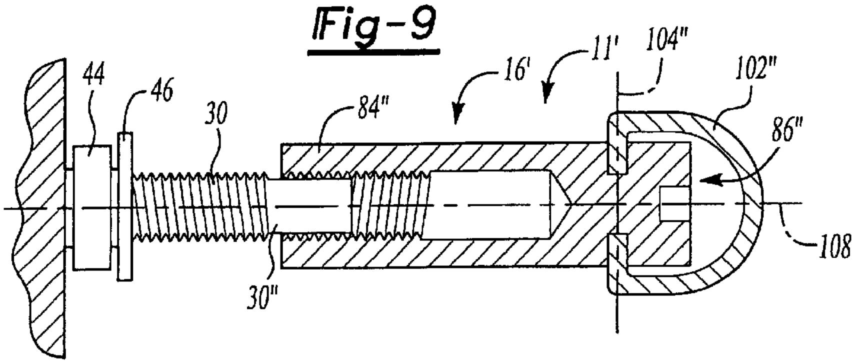
FIG. 10 is a partial longitudinal cross sectional view of a third embodiment of the cylinder liner removal tool.

Referring to FIG. 10, yet a third embodiment of the present invention is shown. The cylinder liner removal tool 11" has a combination portion 16" which not only replaces both the torquing portion 16 and the lifting portion 18 like the second embodiment, but also replaces the nut 40 of the gripping portion 12. Unlike the second embodiment, the third embodiment need not be flipped around when changing from the torque down operation to the lifting operation. Hence, the combination portion 16" has a female thread end 84" for threading down upon the bearing washer 46 of the gripping portion 12. The combination portion 16" also has a ratchet-lifting end 86" comprising the driver recess 108" and the hook 102". Similarly to the second embodiment, the hook 102" has a pivoting axis 104" intersecting the centerline 106". The female thread end 84" and the driver recess 108" are centered about the centerline 106".

Although the preferred embodies of the present invention have been disclosed various changes and modifications may be made thereto by one skilled in the art without parting from the scope and spirit of the invention as set forth in the appended claims. It is also understood that the terms used here are merely descriptive rather than limiting and that various changes in terminology may be made without departing from the scope and spirit of the invention.

I claim:

1. A tool for frictionally engaging a cylinder liner for removal and insertion of the cylinder liner and a piston assembly within an engine block, the tool comprising:

a rod having a leading end and a trailing end, the trailing end being threaded;

a stop engaged to the leading end of the rod;

a mandrel having an outer surface, the rod circumscribed by the outer surface;

a shoulder having a shelf portion penetrated by the rod, the shelf portion disposed perpendicular to the rod and engaged to the mandrel;

a plate disposed between the stop and the mandrel, the rod extended through the plate, the plate disposed radially inward to the outer surface of the wall; and a nut engaged threadably to the trailing end of the rod, the mandrel, the shoulder and the plate disposed between the stop and the nut, the nut having a leading position and a trailing position defined by an engagement range length along the rod, the mandrel having greater flexibility than the shoulder and the plate so that rotation of the nut toward the leading position from the trailing position axially compresses the mandrel causing the outer surface to extend radially outward thereby engaging the cylinder liner.

2. The tool as set forth in claim 1 wherein the mandrel comprises a wall, a base portion and a recess, the recess defined by the wall and the base portion, the rod extended through the recess and the base portion, the wall having a first end and a second end, the outer surface extended between the first and second ends, the wall defined radially between the outer surface and the recess, the first end attached to the base, the second end engaged to the shelf portion of the shoulder, the outer surface defining at least one channel extended circumferentially about the wall, each channel separated axially, wherein rotation of the nut toward the leading position from the trailing position axially compresses the wall causing the wall to radially expand outward and the outer surface of the mandrel to thereby engage the cylinder liner.

3. The tool as set forth in claim 2 wherein the shoulder comprises a plug portion, the rod extended through the plug portion, the plug portion disposed in the recess of the mandrel.

4. The tool as set forth in claim 3 wherein the outer surface has at least one circumscribing channel.

5. The tool as set forth in claim 4 further comprising:

the plug portion of the shoulder having a free end and a secured end, the secured end attached to the shelf portion; and the base portion of the mandrel having a bottom surface contiguous and perpendicular to an inner surface of the wall, the bottom surface of the base portion and the inner surface of the wall defining the recess, the bottom surface displaced axially from the free end of the plug portion at a pre-defined length when the nut is in the trailing position, the pre-defined length being greater or equal to the engagement range length.

6. The tool as set forth in claim 5 further comprising a bearing penetrated by the rod, the bearing disposed between the shelf portion of the shoulder and the nut.

7. The tool as set forth in claim 6 wherein the rod is concentric to the plate, the wall of the mandrel, the base of the mandrel, the plug portion of the shoulder, the shelf portion of the shoulder, and the bearing.

8. The tool as set forth in claim 7 wherein the plate, the wall of the mandrel, the base of the mandrel, the plug portion of the shoulder, the shelf portion of the shoulder, and the bearing are cylindrical.

9. The tool as set forth in claim 8 comprising:

a bearing washer disposed between and contacting the bearing and the nut, the bearing washer penetrated by the rod;

the stop being a nut engaged threadably to the rod; and a stop washer disposed between and contacting the stop nut and the plate the stop washer penetrated by the rod.

10. The tool as set forth in claim 9 further comprising:

a removable torquing portion having a socket end, a driver end and an extension member having a bore, the extension member attached concentrically between the driver end and socket end, the bore concentric to the extension member and in communication with the socket end, the trailing end of the rod disposed within the bore when the socket is engaged removably to the nut, the torquing portion for rotating the nut between the leading position and the trailing position; and a removable lift portion having a hook end and a female threaded end, the female threaded end threaded to the trailing end of the rod when the nut is in the leading position and the torque member has been removed.

11. The tool as set forth in claim 10 wherein the lift member has an extension portion extended between the hook end and the female threaded end, the extension portion having a bore in communication with the female threaded end.

12. The tool as set forth in claim 9 further comprising:

the trailing end of the rod having a threaded bore, the bore concentric to the rod; and a removable combination torque-lift portion having:

a combination socket-hook end having a socket and a hook, the socket engageable to the nut, a combination driver-male threaded end having male threads and a driver recess, the male threads concentric to the driver recess, the male threads engageable to the threaded bore of the trailing end for lifting the cylinder liner and piston assembly, and an extension member extended between the combination socket-hook end and the combination driver-male threaded end, the extension member having a bore in communication with the socket of the combination socket-hook end, the hook connected pivotally to the combination torque-lift portion.

13. The tool as set forth in claim 12 wherein the hook has a pivoting axis traversing a centerline of the extension portion.

14. A tool for frictionally engaging a cylinder liner for removal and insertion of the cylinder liner and a piston assembly within an engine block, the tool comprising:

a gripping portion having:

a rod having a leading end and a trailing end, the trailing end being threaded, a stop engaged to the leading end of the rod, a mandrel having an outer surface, the rod circumscribed by the outer surface, a shoulder having a shelf portion penetrated by the rod, the shelf portion disposed perpendicular to the rod and engaged to the mandrel, a plate disposed between the stop and the mandrel, the rod extended through the plate, the plate disposed radially inward to the outer surface of the wall, and a nut engaged threadably to the trailing end of the rod, the mandrel, the shoulder and the plate disposed between the stop and the nut, the nut having a leading position and a trailing position defined by an engagement range length along the rod, the mandrel having greater flexibility than the shoulder and the plate so that rotation of the nut toward the leading position from the trailing position axially compresses the mandrel causing the outer surface to extend radially outward thereby engaging the cylinder liner;

a removable torquing portion having a socket end, a driver end and an extension member having a bore, the extension member attached concentrically between the driver end and socket end, the bore concentric to the extension member and in communication with the socket end, the trailing end of the rod disposed within the bore when the socket is engaged removably to the nut, the torquing portion for rotating the nut between the leading position and the trailing position; and a removable lift portion having a hook end and a female threaded end, the female threaded end threaded to the trailing end of the rod when the nut is in the leading position and the torque member has been removed.

15. The tool as set forth in claim 14 wherein the mandrel comprises a wall, a base portion and a recess, the recess defined by the wall and the base portion, the rod extended through the recess and the base portion, the wall having a first end and a second end, the outer surface extended between the first and second ends, the wall defined radially between the outer surface and the recess, the first end attached to the base, the second end engaged to the shelf portion of the shoulder, wherein rotation of the nut toward the leading position from the trailing position axially compresses the wall causing the wall to radially expand outward and the outer surface of the mandrel to thereby engage the cylinder liner.

16. The tool as set forth in claim 15 wherein the shoulder comprises a plug portion, the rod extended through the plug portion, the plug portion disposed in the recess of the mandrel.

17. The tool as set forth in claim 16 wherein the outer surface has at least one circumscribing channel.

18. A tool for frictionally engaging a cylinder liner for removal and insertion of the cylinder liner and a piston assembly within an engine block, the tool comprising:

a rod having a leading end and a trailing end, the trailing end being threaded;

a stop engaged to the leading end of the rod, the stop extended radially outward from the rod;

a mandrel disposed concentrically about the rod and axially between the stop and the trailing end of the rod, the mandrel having a wall, a base portion and a recess, the wall having an outer surface, an inner surface, a first end and a second end, the wall defined radially by the outer and inner surfaces, the wall extended axially between the first and second ends, the recess defined by the inner surface of the wall and the base portion, the rod extended through the base portion, the rod circumscribed by the wall;

a shoulder disposed concentrically about the rod, the shoulder having a plug portion and a shelf portion, the plug portion disposed in the recess of the mandrel, the shelf portion disposed perpendicular to the rod and engaged to the second end of the mandrel; and a plate disposed concentrically about the rod between the stop and the base portion of the mandrel, the plate having a plate circumference, the shelf portion of the shoulder having a shelf circumference, the plate and shelf circumferences being equal and disposed radially inward from the outer surface and radially outward from the inner surface of the wall, the mandrel having greater flexibility than the shoulder and the plate.

19. The tool as set forth in claim 18 further comprising a nut engaged threadably to the trailing end of the rod, the mandrel, the shoulder and the plate disposed between the stop and the nut, the nut having a leading position and a trailing position defined by an engagement range length along the rod, wherein rotation of the nut toward the leading position from the trailing position axially compresses the mandrel causing the outer surface to extend radially outward thereby engaging the cylinder liner.

20. The tool as set forth in claim 18 comprising a combination portion having:

a female end engaged threadably to the trailing end of the rod, the female end having a leading position and a trailing position defined by an engagement range length along the rod, wherein rotation of the combination portion toward the leading position from the trailing position axially compresses the mandrel causing the outer surface to extend radially outward thereby engaging the cylinder liner; and a ratchet-lifting end having a driver recess and a pivoting hook, the driver recess disposed concentrically to the female end, the pivoting hook having a pivoting axis intersected by a centerline of the combination portion.

* * * * *